United States Patent [19]

Yamada

[11] 3,999,188

[45] Dec. 21, 1976

[54] INK-JET RECORDING APPARATUS

[75] Inventor: Takahiro Yamada, Hitachi, Japan

[73] Assignee: Hitachi, Ltd., Japan

[22] Filed: Dec. 2, 1974

[21] Appl. No.: 528,927

[30] Foreign Application Priority Data

Dec. 5, 1973 Japan .......................... 48-135367

[52] U.S. Cl. .................................................. 346/75

[51] Int. Cl.$^2$ ........................................ G01D 18/00

[58] Field of Search ........................................ 346/75

[56] References Cited

UNITED STATES PATENTS

| | | | |
|---|---|---|---|
| 3,596,276 | 7/1971 | Lovelady et al. | 346/75 X |
| 3,681,778 | 8/1972 | Keur | 346/75 |
| 3,750,191 | 7/1973 | Naylor | 346/75 |
| 3,769,630 | 10/1973 | Hill et al. | 346/75 |
| 3,836,912 | 9/1974 | Ghougasian | 346/75 |
| 3,866,237 | 2/1975 | Meier | 346/75 |

*Primary Examiner*—Joseph W. Hartary
*Attorney, Agent, or Firm*—Craig & Antonelli

[57] ABSTRACT

An ink-jet recording apparatus is disclosed in which ink particles are periodically generated, the ink particles are charged by an information recording signal synchronous with the period of the generation of the ink particles and the charged ink particles are deflected in accordance with the respective charge amounts to record a desired image on a recording medium. The ink particles charged by the information recording signal includes a first group to be used for recording and a second group to be used for the detection of whether the phase of the information recording signal is adequate or not. The deviation of the phase of the information recording signal from the timing of the periodic generation of the ink particles is detected by detecting the charge amount of the ink particle of the second group, so that the phase of the information recording signal is automatically shifted to correct the phase deviation. Thus, the first ink particle group is charged by an optimized information recording signal.

2 Claims, 12 Drawing Figures

FIG. I

INK-JET RECORDING APPARATUS

The present invention relates to an ink-jet recording apparatus and more particularly to a device in the ink-jet recording apparatus for matching the timing of generation of ink particles to the phase of a recording signal.

In an ink-jet recording apparatus, a desired information image is recorded in a form of dots on a recording medium such as recording peper by impinging ink particles thereupon. A nozzle to which compressed ink is supplied, is energized by an electro-mechanical transducer element connected with a high frequency power source. Upon the energization of the nozzle, the compressed ink is ejected from the tip of the nozzle to form a jet column of ink. The ink-jet column is constricted in synchronism with the period of the energization of the nozzle by the electro-mechanical transducer element and the degree of constriction increases spontaneously until ink particles are separated from the ink column. A pair of charging electrodes are disposed at the place where the ink column is separated into particles. When a recording signal in synchronism with the period of the energization of the nozzle by the electro-mechanical transducer element is applied to the charging electrodes, the separated ink particles are charged in accordance with the amplitude of the recording signal. When the charged ink particles are passed between a pair of deflecting electrodes connected with a high dc voltage source, they are deflected in accordance with the respective charge amounts. Ink particles undesired for the formation of recording dots are blocked by a screening plate (gutter) while ink particles desired for the recording are passed through the screening plate and deposited on the recording medium to form thereon recording dots corresponding to the information.

In such a conventional ink-jet recording apparatus, in order to obtain desired recording dots on the recording medium by properly deflecting the ink particles, proper voltages in accordance with the recording signal must be exactly applied to the charging electrodes when the ink particles are separated from the ink-jet column. However, the separation of the ink particles from the ink column will take place at arbitrary instants during each period of the energization of the nozzle and the timing of the separation depends not only upon the pressure for supply of ink to the nozzle, the physical property of the ink, the frequency of the energization of the nozzle and the magnitude of the energization but also upon the environment where the recording apparatus is placed. Further, the timing varies due to aging effect even during recording operation since said conditions vary.

Accordingly, when the ink particles are generated with a normal timing with respect to the waveform of the nozzle energizing signal, the ink particles are charged to predetermined charge amounts by applying the recording signal to the charging electrodes with a match to the normal timing. Even if the timing of the generation of the ink particles is slightly fluctuated from the normal one, the resulting record will not be so adversely effected.

However, if the timing of the generation of the ink particles is deviated and falls upon the rising or falling portion of the recording signal, the ink particles are charged by the voltage of the rising or falling portion so that a desired charge amount cannot be given to the ink particle. In order to eliminate this kind of error to perform a desired charging, therefore, it is necessary either to shift the timing of the generation of the ink particles by shifting the phase of the waveform of the nozzle energizing signal by a predetermined time width, or to relatively shift the phase of the recording signal.

With the conventional recording apparatus, such a phase control is left to an operator. Namely, the operator checks the quality of a picture image formed on the recording medium to detect the deviation of the timing of the generation of the ink particles from the phase of the recording signal in order to manually correct the deviation. It is, therefore, impossible in the conventional device to always and exactly record the information successively sent to the recording appartus. For this reason, such an apparatus as described above has not found its use in the field of practical application.

It is, therefore, one object of the present invention to provide an ink-jet recording apparatus which can produce a picture image to be recorded with high fidelity.

Another object of the present invention is to provide an apparatus for exactly charging ink particles generated from a nozzle with predetermined charge amounts in accordance with a recording signal.

An additional object of the present invention is to provide an apparatus which can perform continuous and correct recording through the proper charging of ink particles with predetermined charge amounts in accordance with an information by automatically correcting the phase of a recording signal.

A further object of the present invention is to provide an apparatus which can perform such an automatic correcting operation that the ink particles to be used for recording may be charged with predetermined charge amounts.

According to the present invention, there is provided an ink-jet recording apparatus comprising a nozzle supplied with ink, means for causing the ink to periodically generate as ink particles from the nozzle, means for charging the ink particles in accordance with a recording signal synchronous with the period of the generation of the ink particles, and means for detecting the charged ink particles in accordance with their charged states to record the charged ink particles on a recording medium, wherein the ink particles generated from the nozzle includes a first group used for the recording on the recording medium and a second group used to the detection of the phase of the recording signal, and said apparatus further comprises means for shifting the phase of the recording signal by information provided from the charged state of the ink particle of the second group.

Other objects, features and advantages of the present invention will become apparent when reading the following description in conjunction with the accompanying drawings, in which.

Figure 9:
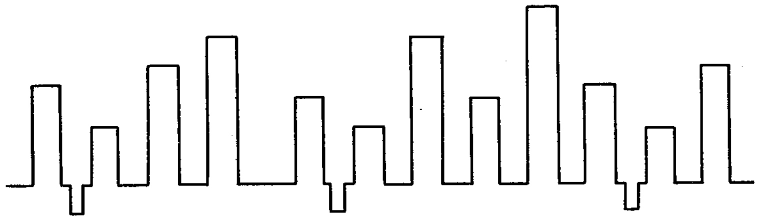
Figure 10:
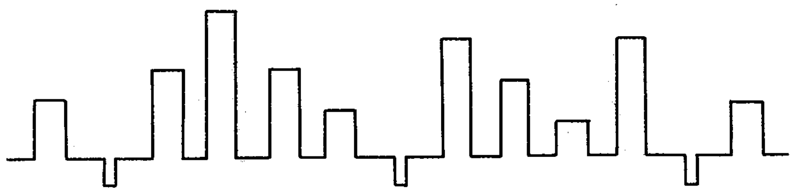
Figure 11:
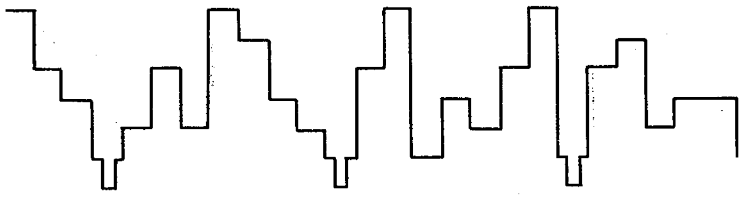
Figure 12:
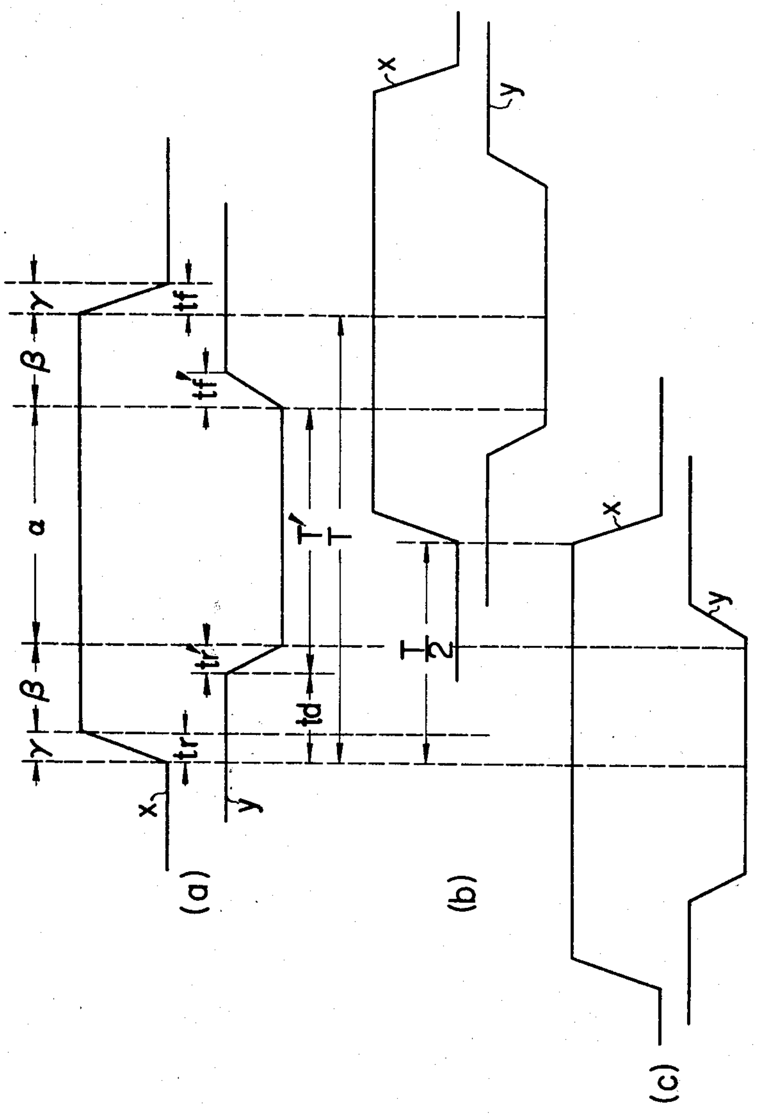

FIG. 9 to FIG. 11 respectively show the waveforms of signals used to charge ink particles in other embodiments of the present invention; and FIG. 12 is a diagram useful to explain the operation of an ink-jet recording device in the case where the rise and fall times of the recording signal are not negligible.

Figure 1:
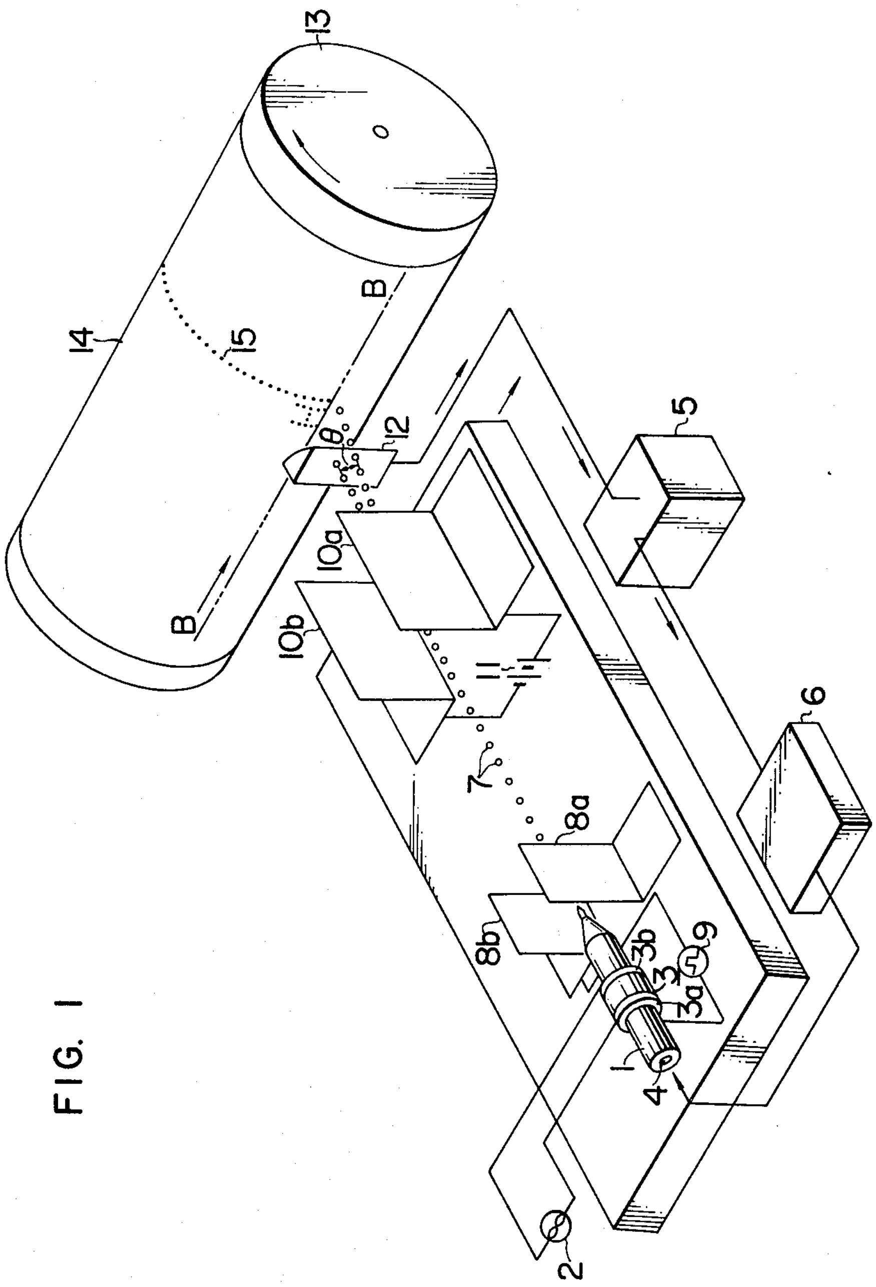
FIG. 1 shows a fundamental structure of an ink-jet recording apparatus according to the present invention.

In FIG. 1 showing a fundamental structure of an ink-jet recording apparatus according to the present invention, a jet nozzle 1 to eject ink therefrom is so shaped as to have a diameter of about 60 $\mu$ and the main body of nozzle is provided with an electro-mechanical transducer element (energizing element) 3 of an annular form mounted thereto so that the nozzle 1 is mechanically energized at a frequency of about 70 KHz. The energizing element 3 is made of electrostrictive material, e.g. sintered mixture of lead titanate and lead zirconate. When a reference signal or voltage of 10 to 30 V having a frequency of 70 KHz is applied from a high frequency power source or reference oscillator 2 to electrodes 3*a* and 3*b* disposed on the end surfaces of the energizing element 3, the element electrostrictively vibrates to produce a mechanical energy. This mechanical energy may be produced by a magnetostrictive element.

Compressed ink 4 is supplied from a tank 5 through a pump and pressure regulator mechanism 6 to the nozzle 1. The pressure applied to the ink 4 is set to about 3 – 4 $Kg/cm_2$. The period of the generation of ink particles 7 from the tip of the nozzle 1 to which the compressed ink 4 is supplied is in synchronizm with the period of the reference signal from the reference oscillator 2 to the energizing element 3. Near the nozzle 1 are provided a pair of charging electrodes 8*a* and 8*b* which form an electrostatic capacitance with the ink particles 7 so as to charge them. The relative position of the electrodes 8*a* and 8*b* with respect to the nozzle 1 is such that the ink jet ejected from the nozzle 1 is constricted and separated into ink particles in the midst of the electrodes 8*a* and 8*b*. The gap between the electrodes 8*a* and 8*b* is about 2 mm and the length of each of the electrodes in a direction along which the ink particles travel is about 5 mm. The electrodes 8*a* and 8*b* are connected with the same potential, that is, an information signal voltage of about 200 V is applied between the nozzle 1 (compressed ink 4) and the electrodes 8*a* and 8*b* from an information signal voltage source 9. When the information signal (recording signal) is, for example, positive in polarity, the ink particles is negatively charged. A pair of deflecting electrodes 10*a* and 10*b* are disposed on both the sides of the traveling path of the ink particles 7 and a dc voltage of 3 to 4 KV is applied between the electrodes 10*a* and 10*b* from a dc high voltage source 11. The deflecting electrodes 10*a* and 10*b* are at a distance of about 5 mm from the charging electrodes 8*a* and 8*b*, the gap between the electrodes 10*a* and 10*b* is about 5 mm at the entrance side of the ink particles 7 and about 7 mm at the exit side thereof, and the length of each deflecting electrode is about 30 mm. The negatively charged ink particles 7, during their passage through the gap between the deflecting electrodes 10*a* and 10*b* are deflected toward the electrode 10*a* which is positive with respect to the electrode 10*b* and then reaches a recording medium 14 supported or rolled on the surface of a rotary drum 13 to form recording dots 15. The angle $\theta$ of deflection of the ink particle 7 is proportional to the amount of the charges thereon and therefore to the amplitude of the recording voltage applied to the ink particle from the recording signal source 9, provided that the voltage applied between the electrodes 10*a* and 10*b* is constant.

A bucket 12 serves to collect for reuse the undesired ink particles not subjected to deflection and having travelled straight, and it is so located that the ink particles with their path deflected may not hit it. The rotary drum 13 with the recording medium 14 rolled thereon is rotated in a direction indicated by an arrow as shown in FIG. 1. The pattern of information is recorded on the recording medium 14 with recording dots 15 formed by ink particles 7 impinging upon the medium 14. The ink particle ejecting system including the nozzle 1, the charging electrodes 8*a* and 8*b*, the deflecting electrodes 10*a* and 10*b* and the bucket 12, is moved parallel to the axis of the drum 13 so that the ink particles 7 may fall on the recording medium 14 along a broken line B—B. Accordingly, the picture image recorded on the recording medium 14 comprises a group of the scanning lines formed by the ink particles 7 from the nozzle 1, deflected according to the angles of deflection.

Figure 2:
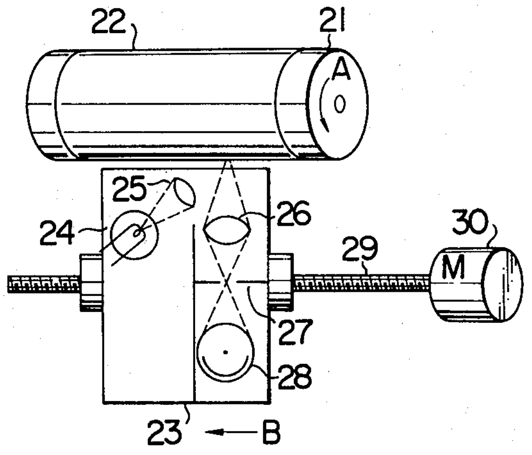
FIG. 2 shows a schematic structure of a photoelectric transducer device.

FIG. 2 shows a photo-electric transducer device for picking up such a picture signal, i.e. recording signal, for use in the ink-jet recording apparatus as described above. In FIG. 2, a rotary drum 21 has an original 22 rolled thereon and is rotated in a direction indicated by an arrow A. An optical system 23 comprises a light source lamp 24, a condenser lens 25, an objective lens 26, a slit 27 and a photo-electric detector element 28 such as a photomultiplier or phototransistor. The light emitted from the source 24 and condensed through the lens 25 is cast on the orignal 22 and the reflected light from the original 22 is collected by the lens 26. The collected light is led through the slit 27 into the photo-electric detector element 28 so as to be converted to the corresponding electric signal. The optical system 23 is driven in a direction (indicated by an arrow B) parallel to the axis of the rotary drum 21, by a shifting screw 29 rotated by a drive motor 30 so that the original 22 is sequentially scanned from one end thereof. The relative movement of the rotary drum 21 and the optical system 23 is precisely in synchronism with that of the recording drum 13 and the nozzle 1. The amplitude-modulated picture signal obtained through the photoelectric conversion of the original 22 is pulse-modulated to produce a recording signal to charge the ink particles 7.

Figure 3:
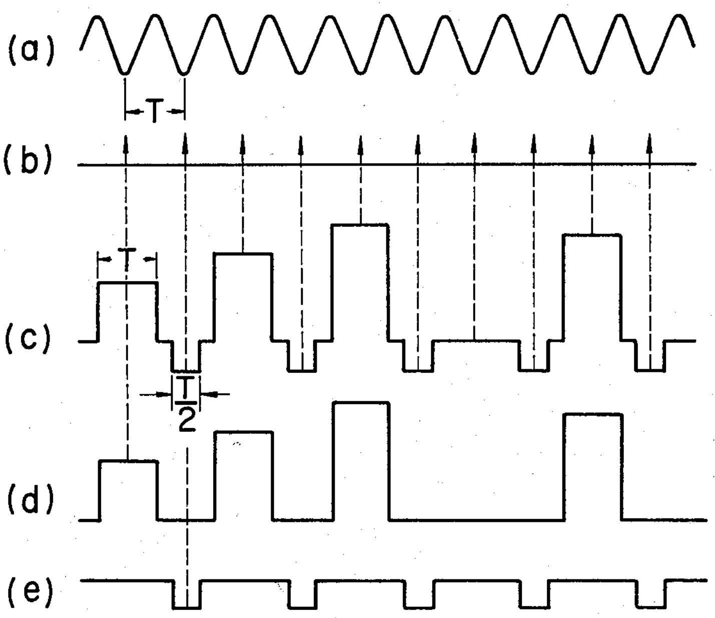
FIG. 3 to FIG. 5 show the characteristics of the charging of ink particles according to the present invention.

FIG. 3 is a time sequence which shows a signal applied to the charging electrodes, the waveform of a signal to energize the nozzle (equivalent to the reference signal supplied from the reference oscillator 2 and having a predetermined period T) and the timing of the generation of ink particles, all being used when the ink-jet recording apparatus is in its recording operation. In FIG. 3, the diagram (*a*) corresponds to the waveform of the nozzle energizing signal, the diagram (*b*) to the timing of the generation of the ink particle, and the diagram (*c*) to the waveform of a signal to charge the ink particle in the case where every other particle of successive ink particles is used for recording. The waveform (*c*) is obtained by superposing a recording signal having a pulse duration of T and corresponding to the diagram (*d*), upon a signal for phase detection, corresponding to the diagram (*e*), which serves to charge the ink particles generated between those used for recording and to detect whether the phase of the recording signal (*d*) is appropriate or not. The polarity of the phase detecting signal (*e*) is opposite to that of the recording signal (*d*) and the signal (*e*) has a pulse width of T/2. On the other hand, the phase relation between the recording signal (*d*) and the phase detecting signal (*e*) is selected such that the phase of the nozzle energizing signal (*a*) corresponding to the middle point of the peak level of the signal (*d*) is equal to that of the signal (*e*).

Figure 4:
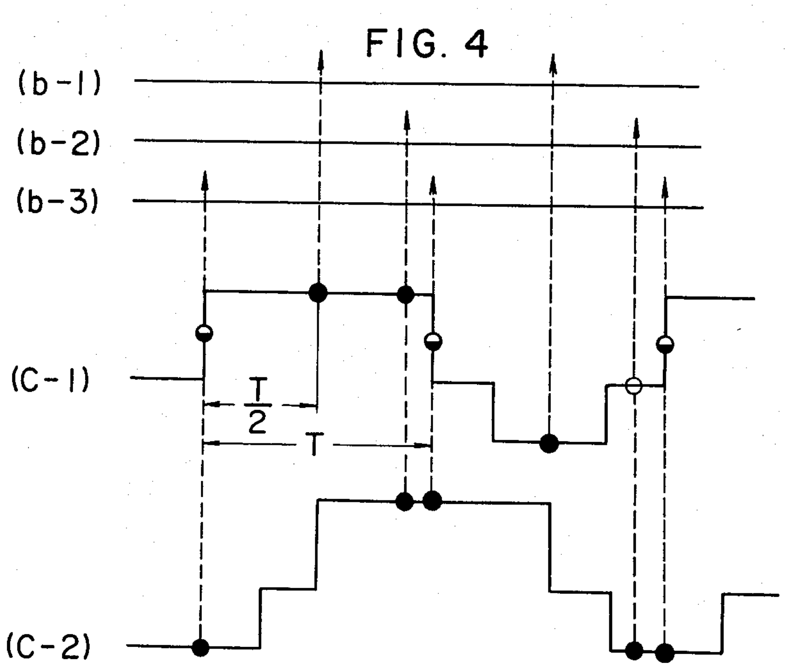
Figure 5:
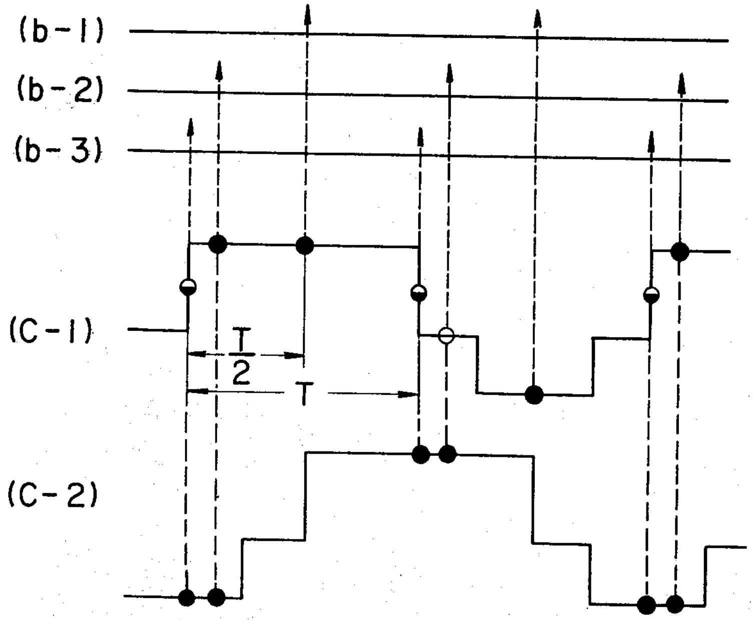

Now, the description of how the designed objects can be attained with such a charging signal (*c*), will be given below with the aid of FIGS. 4 and 5. In these figures, (*b*-1), (*b*-2) and (*b*-3) indicate the timings of forming ink particles. FIG. 4 corresponds to the case where the phase of the timing gradually lags and FIG. 5 to the case where the phase of the timing leads. On the other hand, (*c*-1) and (*c*-2) designate the signals applied to the charging electrodes to charge the ink particles. The signal (*c*-2) is shifted by T/2 in phase with respect to the signal (*c*-1). In FIGS. 4 and 5, the black dots ●; the black-and-white dots ◒ and the white dots ○ indicate the ink particles in the completely charged states, the incompletely charged states and the non-charged states, respectively.

If the ink particles generated from the nozzle are charged by the signal (*c*-1) shown in FIG. 4 in the case where the timing of the generation of the ink particles has such a phase (*b*-1) as shown in FIG. 4, then the ink particles can be respectively charged up to the desired levels since the charging of the ink particles takes place at the peak values of the pulse signal (*c*-1).

However, if the timing has a lagged phase such as shown at (*b*-3) in FIG. 4, the normal charging of the ink particles is impossible since the charging occurs in this case only during the transient times such as rise and fall times. The timing indicated at (*b*-2) necessarily exists while it shifts from state (*b*-1) to state (*b*-3). In the case of the timing (*b*-2), as shown at the signal (*c*-1) in FIG. 4, some ink particles can be charged up to the desired levels by the recording signal pulse while the other cannot be charged at all by the phase detecting pulse having a narrower pulse width.

Accordingly, if it is detected that the ink particles are not charged at all by the phase detecting pulse signal, the phase of the signal (*c*-1) is shifted by T/2 so as to be as shown at (*c*-2) in FIG. 4. The signal (*c*-2) is maintained until the timing (*b*-3) has been reached. By controlling the phase of the ink particle charging signal in such a manner as described above, the ink particles for phase detection are charged by the phase detecting pulse while the ink particles for recording are charged by the recording signal pulse near the middle point in the pulse width thereof. The description concerning FIG. 5 will be omitted since what is to be said with FIG. 5 is self-evident on the analogy of what has been said with FIG. 4.

Figure 6:
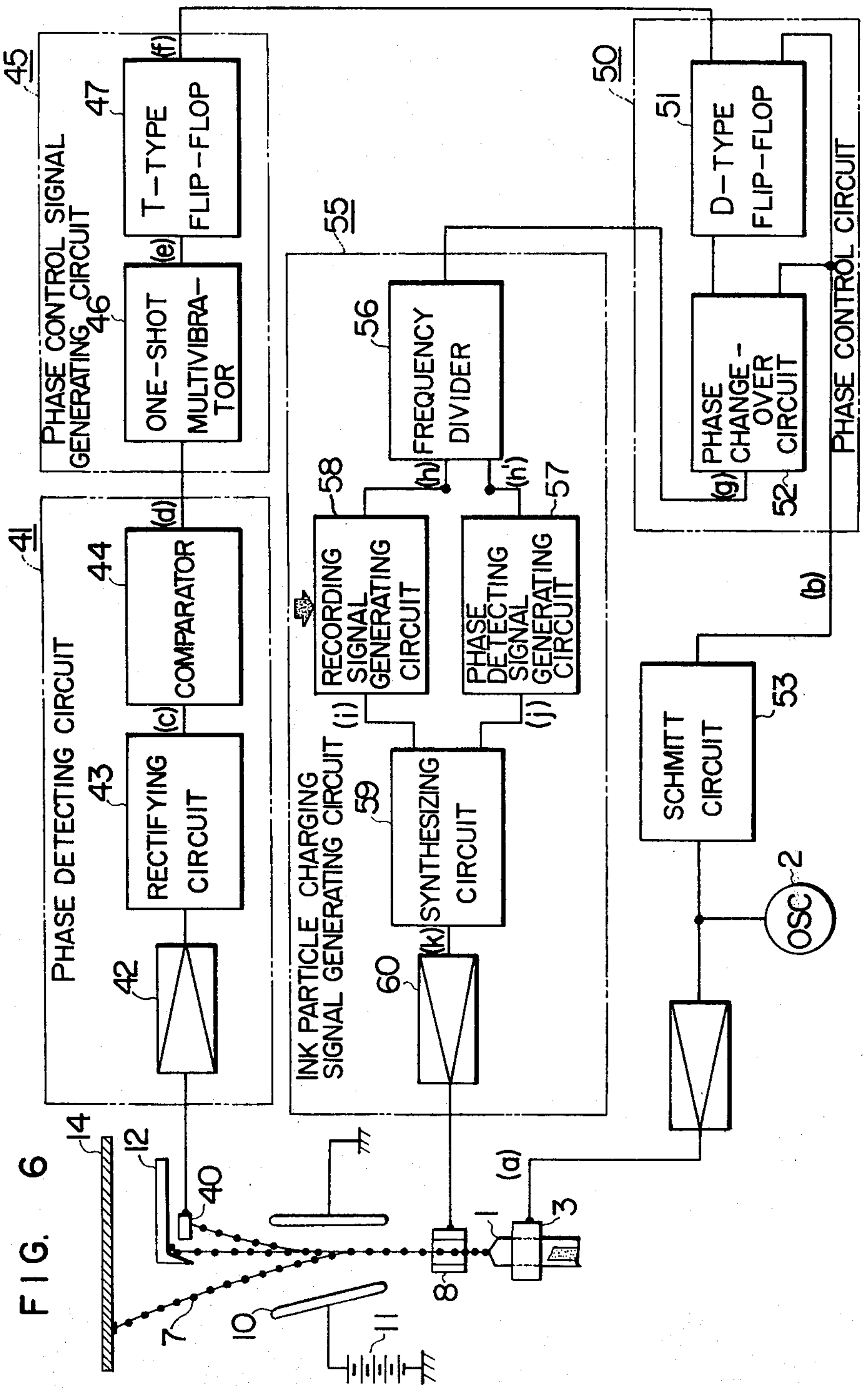
FIG. 6 is a block diagram of an ink-jet recording apparatus as one embodiment of the present invention.

FIG. 6 is a block diagram of an ink-jet recording apparatus as one embodiment of the present invention, in which the same reference numerals and characters are applied to like parts or elements as in FIG. 1. The parts or elements mentioned and described before will not be described again in detail. In FIG. 6, a detector 40 is disposed in front of the ink particle screening plate 12. If it is desired to detect the kinetic energy of the ink particles 7, a piezoelectric crystal is used for the detector 40. On the other hand, when the electric charges on each ink particle are to be detected, a mere conductor can serve as such a detector. The detector 40 is connected with a phase detecting circuit 41 including an amplifier 42, a rectifying circuit 43 and a comparator 44. A phase control signal generating circuit 45 constituted of a one-shot multivibrator circuit 46 and a T-type flip-flop circuit 47, is connected with the output of the phase detecting circuit 41. The output of the comparator 44 is applied to the one-shot multivibrator circuit 46 and the output of the phase control signal generating circuit 45 is derived from the T-type flip-flop circuit 47. The output of the circuit 45 is fed to a phase control circuit 50 including a D-type flip-flop circuit 51 and a phase change-over circuit 52. The phase control circuit 50 also receives clock pulses which are formed by shaping the waveform of the reference signal from the reference oscillator 2 by a Schmitt circuit 53. An ink particle charging signal generating circuit 55 consisting of a frequency divider 56, a phase detecting signal generating circuit 57, a recording signal generating circuit 58, a synthesizing circuit 59 to synthesize the outputs of the circuits 57 and 58 and an amplifier 60, receives the output of the phase control circuit 50. The output of the amplifier 60 is applied to the charging electrodes 8 provided near the nozzle 1. A concrete circuit of such an ink-jet recording apparatus as shown in FIG. 6 is shown by way of example in FIG. 7.

Figure 7:
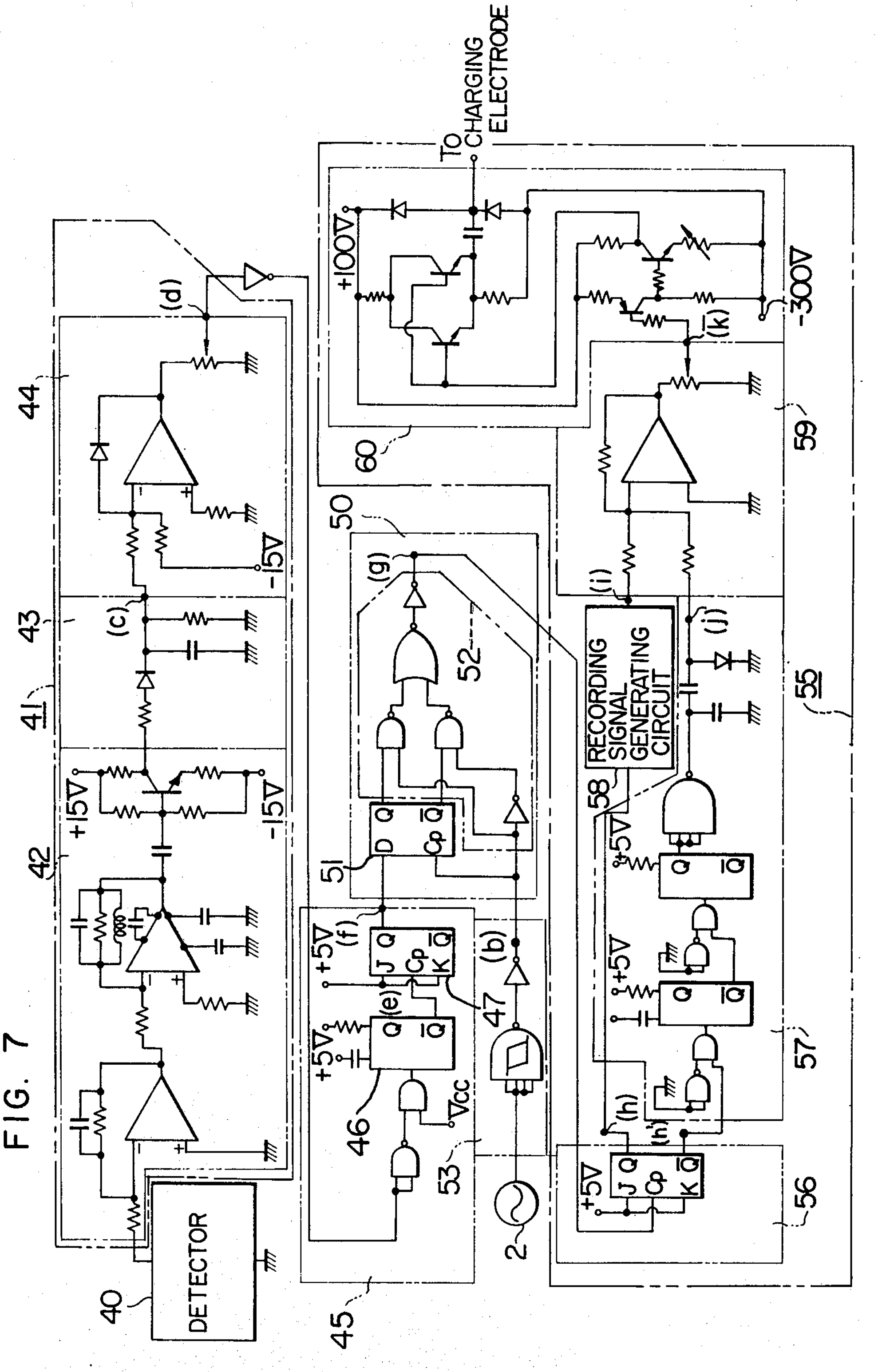
FIG. 7 is a concrete circuit of the ink-jet recording apparatus shown in FIG. 6.
Figure 8:
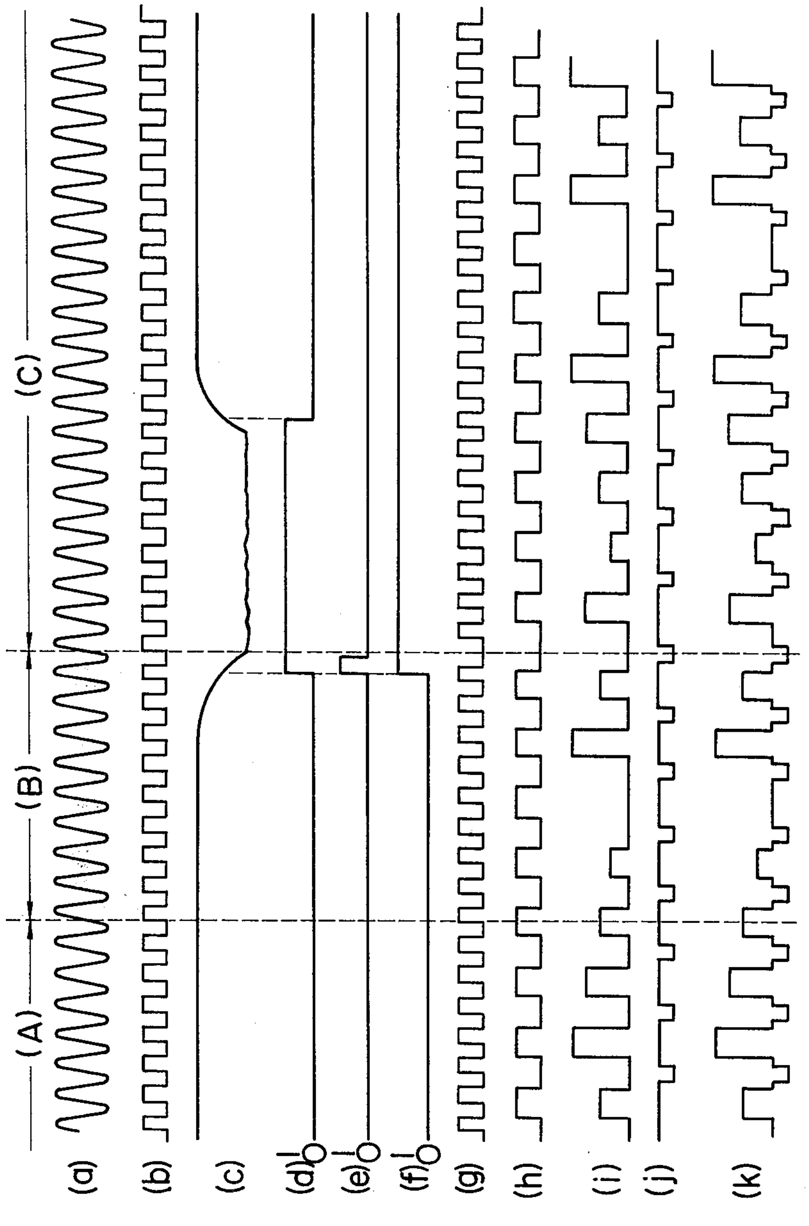
FIG. 8 shows the waveforms of signals appearing at several points in a principal portion of the circuit of FIG. 7.

FIG. 8 shows waveforms appearing at several points in the circuits in FIGS. 6 and 7.

With such a circuit structure as described above, if ink particles are charged by the signal (*c*-1) and the timing of forming the ink particles has a phase (*b*-1), as shown in FIG. 4 or 5, then both the recording pulse and the phase detecting pulse can charge ink particles up to predetermined levels. Namely, in the region indicated at (A) in FIG. 8, the ink particles for recording are charged to desired levels, are deflected during their passage between the deflecting electrodes according to the amounts of charges on them, and stick onto the proper positions of the recording medium 14 to form a recording pattern, while the ink particles for phase detection are charged oppositely with respect to the ink particles for recording so that they hit the detector 40 disposed in front of the screening plate 12. The output electric signal from the detector 40 is sent to the phase detecting circuit 41, that is, amplified by the amplifier 42, converted to a dc signal by the rectifying circuit 43 and led to the comparator 44. Since the output of the rectifying circuit 43 is sufficiently larger due to the ink particles hitting the detector 40, the output of the comparator 44 is held at level 0, as shown at (*d*) in FIG. 8. Through the function of the phase detecting circuit 41, the information that the phase of the recording signal is adequate is transferred through the phase control signal generating circuit 45 to the phase control circuit 50 so that the phase of the clock signal to the ink particle charging signal generating circuit 55 is held as it is.

Next, if ink particles are charged by the signal (*c*-1) and the timing of the generation of the ink particles is shifted from (*b*-1) to (*b*-2), as shown in FIG. 4 or 5, then the ink particles 7 for recording are properly charged enough to form a desired pattern on the recording medium 14 while the ink particles for phase detection are not charged by the phase detecting signal indicated at (*j*) in FIG. 8. Accordingly, the ink particles for phase detection is not sufficiently deflected so that no output can be derived from the detector 40. Consequently, the output, indicated at (*c*) in FIG. 8, of the rectifying circuit 43 gradually falls as seen in the region (B) in FIG. 8. As a result, the output of the comparator 44 changes to level 1 as indicated at (*d*) in FIG. 8 so that the signal representing the change of level from 0 to 1, detected by the phase detecting circuit 41, drives the one-shot multivibrator circuit 46 in the phase control signal generating circuit 45, as seen at (*e*) in FIG. 8, to change the level of the output of the T-type flip-flop circuit 47 from 0 to 1, as seen at (*f*) in FIG. 8. The output of the phase control signal generating circuit 45 is then applied to the D-type flip-flop circuit 51 of the phase control circuit 50. Accordingly, the timing of the change in level from 0 to 1 is synchronized with the timing of the clock pulses obtained by shaping by the Schmitt circuit 53 the waveform of the reference signal from the reference oscillator 2 to the electro-mechanical transducer element 3 and the phase of the clock signal fed through the phase change-over circuit 52 to the ink particle charging signal generating circuit 55 is changed over to a 180° different one, as seen at (*g*) in FIG. 8. Consequently, the recording signal, i.e. ink particle charging signal, is shifted by T/2 from (*c*-1) to (*c*-2) as shown in FIG. 4 or 5 and since the timing of the shifting of the recording signal from (*c*-1) to (*c*-2) is in synchronism with the timing of the generation of ink particles, the ink particles for recording are charged near at the middle point in the pulse duration of the recording pulse and also the ink particles for phase detection are properly charged, being deflected again by the deflecting electrodes 10 to hit the detector 40. As a result, the output, indicated at (*c*) in FIG. 8, of the rectifying circuit 43 increases as seen in the region (C) in FIG. 8, the level of the output of the comparator 44 changes from 1 to 0, and the phase of the clock signal from the phase control circuit 50 is held as it is, until the next undesired phase condition has been reached. Therefore, the ink particle charging signal (*k*), which is obtained by synthesizing by the synthesizing circuit the recording signal (*i*) and the phase detecting signal (*j*), both produced on the basis of the pulses as a frequency-divided version of the clock signal through the frequency divider 56, has its phase maintained unaltered.

As described above, according to the present invention, the phase of the recording signal can be automatically corrected in immediate response to the change in the phase of the timing of the generation of ink particles and therefore ink particles can be always properly charged in accordance with the recording signal without interrupting the recording operation.

Moreover, the present invention in which there is no need for an auxiliary time required for correcting the phase of the recording signal other than the time necessary for recording operation so that the continuous phase correction is possible, can be applied to the multi-nozzle recording system where a plurality of nozzles are simultaneously operated to perform multifold recording.

In the preceding embodiment, the case has been described where every other ink particle is used for recording while all the remaining ink particles are used for phase detection. However, in the case where the change in the phase of the timing of the generation of ink particles is comparatively slow, the ink particles for phase detection may be less densely sampled out. If, in this case, the period of the sampling is kept constant and the operation band widths of the detector 40 and the amplifier 42 are narrowed, the phase detection with low noises becomes possible.

FIG. 9 shows the waveform of the ink particle charging signal used in the case where every other ink particle is used for recording while every tenth particle of the remaining ink particles is charged for phase detection.

Moreover, in the case of, for example, recording characters, the recording information is not continuous but in the lumped distribution. In such a case, every other ink particle for each lump may be used for recording and only one ink particle in the particular lump may be charged to serve for phase detection, as shown in FIG. 10, or alternatively all the ink particles except one, for each information lump may be used for recording with the excepted one charged for phase detection, as shown in FIG. 11.

Further, in the previous embodiments, the width of the recording signal pulse and that of the phase detecting pulse are respectively T and T/2, provided that the period of the generation of ink particles is T, and the phase of the nozzle energizing signal corresponding to the middle point of the peak level of the recording signal pulse is equal to that of the phase detecting pulse.

This is the optimum condition occurring only in the case where the rise and fall times of each pulse in consideration is negligible in comparison with the pulse duration of the pulse and the charges given to each ink particle is determined by the instantaneous voltage which is applied to the charging electrodes when the particular ink particle is on the point of being separated from the ink-jet column.

However, it often happens in practice that the rise and fall times are not negligible and that the charging of each ink particle does not take place but requires an appreciable time.

Now, a description will be given below of how the present invention can be applied to the practical cases which cannot always enjoy such an optimum condition.

FIG. 12(*a*) shows the waveform $x$ corresponding to the characteristic of charging ink particles with the recording signal pulse and the waveform $y$ corresponding to the characteristic of charging ink particles with the phase detecting signal pulse, with the phase of the nozzle energizing signal taken as reference, the rise and fall times of both the signal pulses being approximated by linear segments. FIGS. 12(*b*) and 12(*c*) respectively shows similar waveforms with only a difference of phase shift of T/2 with respect to the waveforms in FIG. 12(*a*). It is assumed here for facilitating the description that the rise time, the fall time and the pulse width of the waveform $x$ is respectively $t_r$, $t_f$ and T while the corresponding times of the waveform $y$ are respectively $t'_r$, $t'_f$ and $T'$, with the phase difference in time between the waveforms $x$ and $y$ equal to $t_d$, as seen in FIG. 12. It should be noted that each of $t_r$, $t'_r$, $t_f$ and $t'_f$ is the sum of the rise or fall time of the signal itself and the time constant required for the signal to charge each ink particle. Accordingly, in case where the time constant is negligible, the waveforms $x$ and $y$ can be regarded as coincident with the recording and the phase detecting signal pulses themselves.

In the region ($\alpha$) in FIG. 12(*a*), both the recording and the phase detecting ink particles are fully charged so that they have desired charges. In the regions ($\beta$), however, the ink particles for recording are fully charged by the recording signal pulse, i.e. waveform $x$, while the ink particles for phase detection are not properly charged by the phase detecting pulse, i.e. waveform y, which has a rising and a falling transitions in the region ($\beta$). In the regions ($\gamma$), the recording pulse $x$ is in its rising and falling transitions and the phase detection pulse vanishes, so that neither of the recording and the phase detecting pulses $x$ and $y$ cannot properly charge ink particles.

Therefore, a phase correction is necessary such that these signal waveforms $x$ and $y$ are shifted in time by T/2, as shown in FIG. 12 (*b*) or 12(*c*), before the phase of the timing of the generation of ink particles has been shifted from region ($\alpha$) to regions ($\gamma$), that is, during the time for which the phase of the timing is in the regions ($\beta$).

In order for the present invention to be applicable, the following conditions are essential:

1. the regions ($\beta$) must exist;
2. the regions ($\beta$) must be reduced to the region ($\alpha$) after phase correction;
3. it is preferable that the regions ($\beta$) exist in both the case where the phase of the timing of the generation of ink particles leads and the case where it lags;
4. ink particles must not be charged during the rise and fall times of the recording signal pulse; and
5. it is preferable for the facility in detecting the phase deviation that the fall time $t'_f$ of the phase detecting signal pulse is equal to or less than the rise time $t'_r$ of the same.

It follows, therefore, from the above conditions that $$\{(T - t_r) - (T' - t'_r)\} > 0 \quad (1),$$

$$T' - t'_r \geqq (T/2) \quad (2),$$

$$t_d + t'_r - t_r = T - (T' + t_d) \quad (3),$$

and $$T - t_r + t_f \leqq T \quad (4),$$

$$t'_f \leqq t'_r \quad (5).$$

From the formulas (1) and (2) follows an expression:

$$T' = (T/2) + t'_r \leqq T' < T - t_r + t'_r \quad (6)$$

By virtue of the formula (3) is obtained an equation:

$$td = [T + t_r - (T' + t'_r)]/(2) \quad (7)$$

Consequently, it is seen that the present invention can be satisfactorily applied if the formulas (5), (6) and (7) are all fulfilled.

Since the ink-jet recording apparatus according to the present invention operates most effectively for the maximum breadth of the region ($\beta$), T' in the formula (6) is such that $$T' = (T)/(2) + t'_r \quad (8)$$

The device operates, therefore, with highest efficiency and stability for the condition that $t_f \leqq t_r$ and $t'_f \leqq t'_r$.

In the case where the rise time and the fall time are negligible in comparison with the signal pulse width and the charges on each ink particle depend on the corresponding instantaneous voltage at the charging electrode, the rise and the fall times $t_r$, $t'_r$, $t_f$ and $t'_f$ are all negligible and it follows from the formulas (6) and (7) that $$(T/s) \leqq T' < T \text{ and } t_d = (T - T'/2)$$

while it follows from the formula (8) that $$T' = (T/2) \text{ and } t_d = (T/4).$$

It is seen that under these conditions the device operates with highest efficiency and stability.

As described above, according to the present invention, ink particles from the nozzle are divided into two groups: the particles used for recording and the particles used for phase detection and the deviation of the phase of the recording signal is automatically detected by virtue of the ink particles for phase detection so that the ink particles can be always properly charged by the recording signal in accordance with the recording information and that the multifold recording system using plural nozzles operating simultaneously can also be realized, if necessary.

What is claimed is:

1. An ink-jet apparatus comprising:

a nozzle supplied with ink;

a reference oscillator for supplying a reference signal having a predetermined time period T;

ink particle generating means for vibrating the ink in said nozzle in response to said reference signal from said reference oscillator to generate ink particles from said nozzle in synchronism with the period of vibration of the ink;

ink particle charging electrode means for constituting an electrostatic capacitance with said ink particles to charge them;

ink particle deflecting means for producing an electrostatic field in a travel path of the ink particles deflected in a predetermined magnitude of deflection; and a phase matching device including i. first circuit means for forming clock pulses in response to said reference signal from said reference oscillator, ii. second circuit means for reading out a recording signal from a recording signal generating circuit on the basis of said clock pulses to apply said recording signal to said ink particle charging electrode means, said recording signal having a pulse width T, and for reading out a phase detecting signal from a phase detecting signal generating circuit on the basis of said clock pulses to apply said phase detecting signal to said ink particle charging electrode means, said phase detecting signal having a pulse width in a range from T/2 to T, a polarity opposite to said recording signal and a phase shifted by T with respect to the middle point of pulse peak level in comparison with said recording signal, said phase detecting signal being applied to said ink particle charging electrode means with a constant period at which pulse portions of said phase detecting signal do not overlap with those of said recording signal, iii. charge amount detecting means for detecting the charge amount of the ink particle charged by said phase detecting signal, iv. phase detecting means for receiving an output of said charge amount detecting means to judge a first charged state of the ink particle in which the charge amount is above a predetermined level and a second charged state of the ink particle in which the charge amount is below said predetermined level, v. phase control signal generating circuit means for generating a phase control signal for phase correction in response to an output from said phase detecting means corresponding to said second charged state, and vi. phase control circuit means for receiving an output of said phase control signal generating circuit means to shift the phases of generation of said recording signal from said recording signal generating circuit and said phase detecting signal from said phase detecting signal generating circuit by T/2, the phase shifting being timed to occur at a predetermined instant selected from the instant of the rise or the instant of the fall of said clock pulses.

2. An ink-jet recording apparatus comprising:

a nozzle supplied with ink;

a reference oscillator for supplying a reference signal having a predetermined time period T;

ink particle generating means for vibrating the ink in said nozzle in response to said reference signal from said reference oscillator to generate ink particles from said nozzle in synchronism with the period of vibration of the ink;

ink particle charging electrode means for constituting an electrostatic capacitance with said ink particles to charge them;

ink particles deflecting means for producing an electrostatic field in a travel path of the charged ink particles to deflect them in accordance with the amount of their charge;

recording medium supporting means for supporting a recording medium in a travel path of the ink particles deflected in a predetermined magnitude of deflection; and a phase matching device including i. first circuit means having a clock pulse forming circuit for receiving said reference signal from said reference oscillator to form clock pulses, ii. second circuit means including a first read out circuit for reading out a recording signal from a recording signal generating circuit on the basis of said clock pulses, said recording signal having a pulse width T, and means for applying said recording signal to said ink particle charging electrode means, and a second read out circuit for reading out a phase signal from a phase detecting signal generating circuit on the basis of said clock pulses, said phase detecting signal having a pulse width in a range from T/2 to T, a polarity opposite to said recording signal and a phase shifted by T with respect to the middle point of pulse peak level in comparison with said recording signal, and means for applying said phase detecting signal to said ink particle charging electrode means, said phase detecting signal being applied with a constant period at which pulse portions of said phase detecting signal do not overlap with those of said recording signal, iii. detector means which is disposed in a predetermined travel path of the ink particle charged by said phase detecting signal and deflected by said ink particle deflecting means and on which the ink particle strikes, iv. phase detecting means having an amplifier for amplifying an output of said detector means, a rectifying circuit for rectifying an output of said amplifier, and a comparator for comparing an output of said rectifying circuit with a predetermined level to produce a binary signal output v. phase control signal generating circuit means having a one-shot multivibrator for receiving an output of said phase detecting means to produce a pulse signal of a predetermined pulse width only when the binary signal output changes from one level to the other level, and vi. phase control circuit means for receiving an output of said phase control signal generating circuit means to shift the timing of formation of the clock pulses in said clock pulse forming circuit of said first circuit means by T/2, on the basis of said pulse signal from said one-shot multivibrator.

* * * * *